United States Patent [19]

Ullrich

[11] Patent Number: 5,334,905

[45] Date of Patent: Aug. 2, 1994

[54] IMMERSIBLE LAMP FOR A PHOTOCHEMICAL REACTOR

[75] Inventor: Bernt Ullrich, Erlensee, Fed. Rep. of Germany

[73] Assignee: Heraeus Instruments GmbH, Hanau, Fed. Rep. of Germany

[21] Appl. No.: 14,639

[22] Filed: Feb. 8, 1993

[30] Foreign Application Priority Data

Feb. 10, 1992 [DE] Fed. Rep. of Germany ....... 4203840

[51] Int. Cl.$^5$ .......................... H01J 7/24; H01J 61/52; H01J 7/26; H01K 1/58
[52] U.S. Cl. ....................................... 313/22; 313/25; 313/24; 313/27; 313/30; 313/35; 362/224; 362/225; 422/24; 250/436
[58] Field of Search ................ 313/25, 22, 24, 27, 313/30, 35, 51, 318; 362/230, 219, 224, 225; 210/748; 422/24; 250/436; 204/277, 302, 304, 308

[56] References Cited

U.S. PATENT DOCUMENTS

| | | | |
|---|---|---|---|
| 2,083,799 | 6/1937 | Roberts | 204/304 |
| 2,624,010 | 12/1952 | Chamberlain et al. | 250/436 |
| 2,681,888 | 6/1954 | McCraw | 204/308 |
| 2,963,603 | 12/1960 | Germer | 313/25 |
| 3,665,235 | 5/1972 | Hugot | 313/24 |
| 4,179,616 | 12/1979 | Coviello et al. | 210/748 |
| 4,288,846 | 9/1981 | Fletcher et al. | . |
| 4,963,783 | 10/1990 | Grossman | 313/22 |
| 5,147,130 | 9/1992 | Watanuki | 313/22 |

FOREIGN PATENT DOCUMENTS

| | | |
|---|---|---|
| 0466584 | 1/1992 | European Pat. Off. . |
| 1020934 | 2/1966 | United Kingdom . |
| 2107110 | 4/1983 | United Kingdom . |

OTHER PUBLICATIONS

Brochure Heraeus Original Hanau D 310625/2C Sep. 1989/VN PK, entitled "Tauchlampen für die Photochemie," published in 1989 by W. C. Heraeus GmbH, Hanau, Germany, p. 13.

*Primary Examiner*—Donald J. Yusko
*Assistant Examiner*—Matthew J. Esserman
*Attorney, Agent, or Firm*—Frishauf, Holtz, Goodman & Woodward

[57] ABSTRACT

An immersible lamp for use in a photochemical reactor has an outer bulb (10) surrounding an inner discharge tube (1) which can be cooled by a flow of inert gas such as nitrogen from a supply chamber (23) though hollow guide rods (6, 7) into a remote end (27) of the outer bulb, and back out through an outlet hole (18) and an exhaust chamber (24). In order to facilitate swapping out of the discharge tube (1) in the event of burnout or changes in output power or output spectrum requirements, without the need for welding or glassblowing expertise, the discharge tube (1) is mounted in a pair of sockets (4,5), one of which (4) is axially slidable. The socket is spring-loaded (8), and thus readily adapts to discharge tubes of differing lengths. The socket slides along guide rods (6, 7, 16) which also serve as electrical supply conductors to the sockets (4, 5). Spacer elements (11) help maintain alignment of the guide rods, sockets, and discharge tube with respect to the axis (12) of the outer bulb (10).

17 Claims, 2 Drawing Sheets

IMMERSIBLE LAMP FOR A PHOTOCHEMICAL REACTOR

FIELD OF THE INVENTION

The present invention relates generally to an immersible lamp for use in a photochemical reactor, and, more particularly, to a lamp with a discharge tube within an outer bulb filled with inert gas. The outer bulb of the invention can be opened for replacement of the discharge tube, which is secured within the outer bulb by a pair of sockets, one of which is axially movable. The sockets provide both mechanical support and electrical contact for the discharge tube's end terminals.

BACKGROUND

Brochure Heraeus Original Hanau D 310625/2C 9.89/VN PK, published in 1989 by W. C. Heraeus GmbH, parent company of the assignee of the present application, discloses, on page 13 thereof, an immersible lamp of modular construction and featuring a high-pressure mercury discharge tube 1. FIG. 8 shows that the discharge tube is fastened with a discharge tube holder 2 and electrical supply line, using clamps and seals. The immersible tube 4, in turn, is suspended within a cooling tube 5 with clamps and seals. A head plate 3.3 supports the tubes and is equipped with an inlet 3.1 and an outlet 3.2 to permit a flow of inert gas to cool the tubes. The cooling tube offers the possibility of water cooling between immersible tube and reaction mass. The connection of the head plate or immersible lamp head with the immersible tube, as well as the connection of the immersible tube with the cooling tube, is accomplished by means of standard flange connections.

THE INVENTION

In conventional immersible lamps, it has been very difficult to swap out the discharge tube because the old electrical connections to the discharge tube had to be broken, and provision of connections to the replacement discharge tube required soldering and melting steps. In practice, this meant that the electrical supply lines usually had to be entirely replaced. Making new welded or soldered connections between the electrical lines and the outer terminals of the discharge tube required extraordinary technical expertise. Further, it was necessary to provide inert gas supply tubes, typically of quartz. Thus, swapping out of discharge tubes, such as might be required to change the power or spectral characteristics of the lamp used in the photochemical reactor, necessitated great expertise and background knowledge of the particular electrical supply conductors and their insulating quartz coatings.

Accordingly, it is an object of the present invention to provide an immersible lamp whose discharge tube can be simply replaced, even with a tube of a different length. A further object is to reduce the number of structural elements within the outer bulb.

Briefly, the immersible lamp of the present invention simplifies discharge tube replacement by mounting the discharge tube using a pair of sockets, one of which is axially movable. The movable socket is spring-loaded, so that adaptation to tubes of different lengths is possible. The sockets provide both mechanical support and electrical contact, so that no soldering or glass-blowing expertise is required.

Further, the structure is stabilized by hollow guide rods, which simultaneously conduct electricity and define channels for flow of cooling gas, eliminating the need for quartz gas supply tubes.

The discharge tube terminals have plug connections, so that optimization of the discharge tube output spectrum, to the photochemicals to be irradiated, is facilitated.

In a preferred embodiment, the immersible lamp has a terminating head which is divided into a gas supply chamber and a gas exhaust chamber. The supply chamber communicates through the hollow guide tubes with the remote end of the outer bulb, and the exhaust chamber communicates directly with the adjacent end of the outer bulb.

The use of inert gas for cooling and flushing assures protection of the current supply conductors against oxidation. A suitable inert gas is nitrogen; of course, the suitability of other inert gases will be apparent to those skilled in the art.

DRAWINGS

FIG. 1a is a longitudinal cross-section of an immersible lamp with its inserted discharge tube, in which the guide rods, extending from the termination region to the outer bulb end, are visible; a break adjacent the discharge lamp results in a shortened illustration;

FIG. 1b is a transverse section along line A—B of FIG. 1a;

FIG. 2 is a similarly shortened longitudinal cross-section along a plane (vertical line of FIG. 1b) perpendicular to the plane defined by guide rods 6,7 extending to the end of the outer bulb.

DETAILED DESCRIPTION OF THE PREFERRED EMBODIMENT

Figures 1A, 1B, 2:
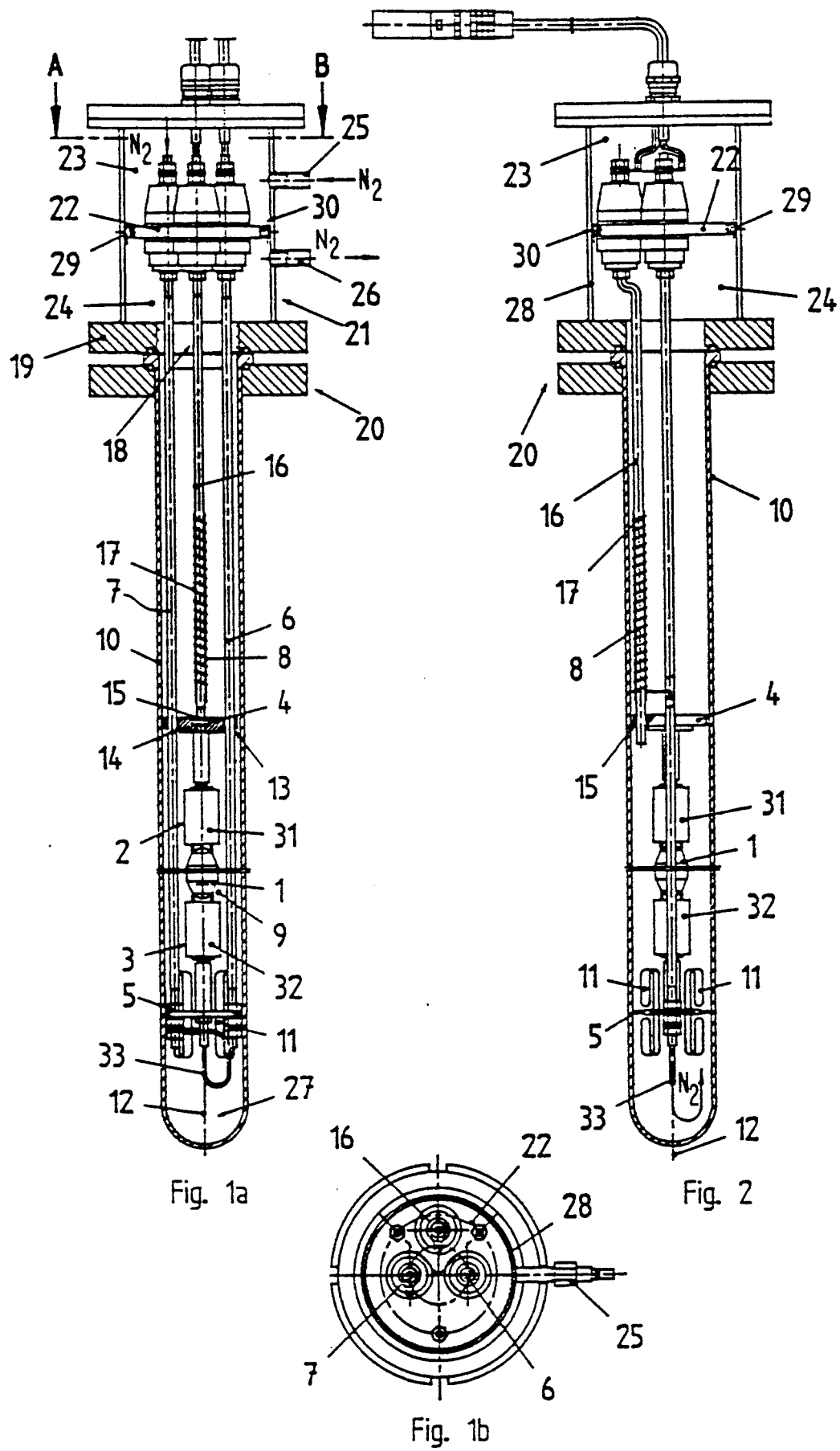

As shown in FIGS. 1a and 1b, a discharge lamp 1 is mechanically secured in, and electrically contacted by, an upper socket 4 and a lower socket 5, serving as a holder. Discharge tube 1 has axially opposed electrical plug terminals 2 and 3 which make contact with sockets 4 and 5, respectively.

Figure 3:
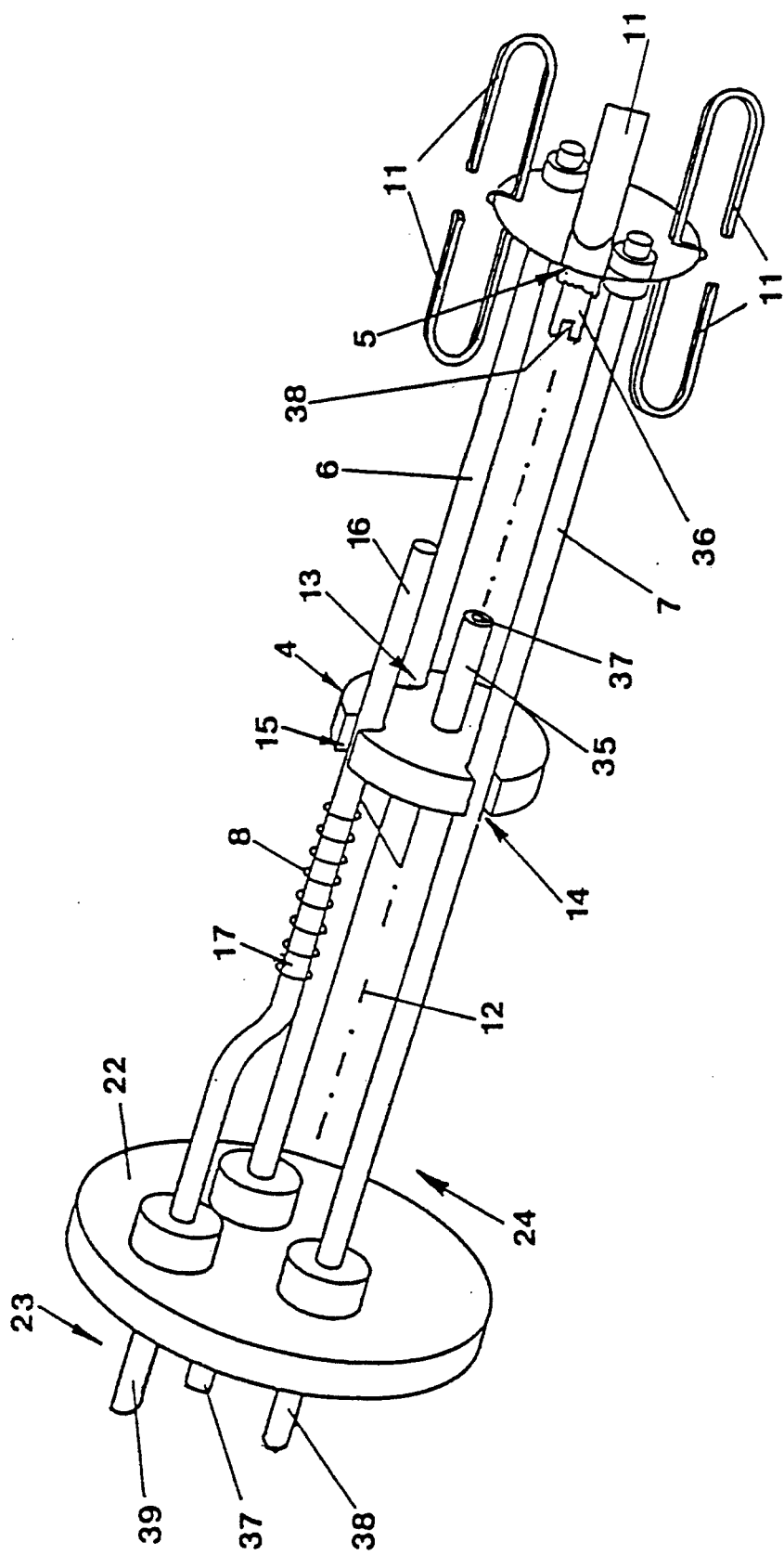
FIG. 3 is a perspective illustration of the discharge lamp holder and current supply line, with the lamp, outer bulb, and termination head removed, for clarity of illustration.

As shown most clearly in FIG. 3, socket 4 is a slidable element which can slide axially along a first guide rod 6 and a second guide rod 7. A coil spring 8, wound around an additional guide rod 16, presses socket 4 against electrical terminal 2 of discharge lamp 1. The axially opposite end of lamp bulb 9 of lamp 1 has an electrical plug terminal 3 which is electrically contacted by, and mechanically secured by, lower socket 5. Discharge tube 1 is releasible by compressing coil spring 8 for disengagement from upper socket 4. Lower socket 5 is permanently secured adjacent the free ends of the two parallel-running guide rods 6,7. On the rim of socket 5, radially extending centering elements or wire loops 11 provide support against the inner surface of outer bulb 10. An axially extending element 11' also helps to center lower socket 5 with respect to longitudinal axis 12 of outer bulb 10.

A disk portion of socket 4 has, in its rim, radial slots 13, 14, 15 which receive the parallel guide rods 6, 7, and 16. Socket 4 is thus slidable, under the influence of spring 8, along longitudinal axis 12. Pressure spring 8 is mechanically secured and electrically connected by a weld 17 to additional guide rod 16. The rigid alignment of the rods assures separation of coil spring 8 from guide rods 6, 7, which are connected to the opposite electrical pole. Guide rods 6, 7, 16 are fed through an opening 18 in a plate 19 (see FIG. 1a) of a terminal section 20 of terminating head 21, which serves as a sealing element of the photo-reactor housing (not shown). An intermediate plate 22 separates terminating head 21 into an inert gas supply chamber 23 and an inert gas exhaust chamber 24. The respective gas connections are designated 25 and 26. As shown in FIG. 1a, a Suitable inert gas is nitrogen ($N_2$).

First and second guide rods 6, 7 are tubular and are open at their upper and lower ends, so that a direct gas connection between inert gas supply chamber and end region 27 of outer bulb 10 exists. The return feed of inert gas takes place through opening 18 in plate 19 of terminal section 20. Although additional guide rod 16 is also tubular, one of its ends is closed, in order to avoid a counterflow of gas in the central region of the outer bulb. The nitrogen flow pattern is indicated by the flow arrows (FIG. 1a, top; FIG. 2, bottom) labelled $N_2$.

FIG. 1b provides further (enlarged) detail in section along line A—B of FIG. 1a. The broken circle indicates intermediate plate 22; the electrical connections to first and second guide rods 6,7 and of additional guide rod 16 are recognizable. In order to prevent mixing of incoming and outgoing inert gases, intermediate plate 22 is sealed against outer wall 28 of terminating head 21 by a circumferential seal 29. Seal 29 is preferably an O-ring which rests in an annular groove 30 in the rim of disk-shaped plate 22.

FIG. 2 illustrates the eccentric position of additional guide rod 16 and the spring 8 coiled thereon, with respect to central axis 12 of outer bulb 10. In order to prevent uneven loading of socket 4, it is guided by means of slots 13, 14, 15 along axis 12 by guide rods 6,7,16, as shown in FIGS. 1b and 3. Present FIG. 2 shows only guide rods 16 and 6; rod 7 is not illustrated, in order to show guide rod 6 behind; in effect, the FIG. 2 view is from the left side of FIG. 1b.

FIG. 1a shows that terminal base elements 31, 32 are secured in socket 4 and lower socket 5, respectively, and that the electrical connection of base 32 is achieved by an additional electrical conductor or line 33. It is, of course, also possible to provide lower socket 5 with a separately connected base.

FIG. 3 shows in greater detail the portion of the structure of the present invention used for insertion of the immersible lamp into the outer tube or bulb. The discharge lamp has base portions 31, 32 with respective pin-like contact terminals 2,3, which are received in the tubular contact elements 35,36 of upper socket 4 and lower holder/socket 5. From FIG. 3, one can see the slots 13,14,15 of socket 4, with whose aid the socket is slidable along axis 12, in order to readily adapt to varying lengths of different discharge tubes to be inserted. The tubular contact elements 35, 36 have respective hollow cylindrical recesses 37, 38, of which only recess 37 is fully visible in this perspective view. Recess 38 is recognizable inside partially broken-away contact element 36.

The coiled pressure spring 8 is fastened, as previously described, at one end by weld connection 17 to guide rod 16. The other end of spring 8 is electrically and mechanically connected to socket 4, an electrical connection being made to tubular contact element 35. Lower socket is fastened at its outside by clip-shaped fasteners which electrically connect it to guide rods 6,7.

Tubular contact element 36 is mechanically secured and electrically connected to holder socket 5. For centering of the lower socket 5, wire loops 11 are provided for support against the inner wall of the outer bulb 10 (not shown FIG. 3). These provide stationary positioning of holder 5; for better visibility of contact element 36, one of elements 11 is broken away.

Guide rods 6, 7, 16 are gas-tightly screwed into intermediate plate 22; the current supply is accomplished via connecting lines 37, 38, 39, of which lines 37, 38 connect to the same potential or voltage. The tubular guide rods 6, 7 are open at their ends, so that the inert gas can flow from inert gas supply chamber 23 through intermediate plate 22 into the end region 27 (shown in FIG. 1a, not FIG. 3) of outer bulb 10. The return flow of inert gas occurs along axis 12, past socket 4, to the inert gas exhaust chamber 24 below intermediate plate 22. According to another embodiment, not illustrated, it is possible to equip the base of the discharge lamp with tubular contact elements, into which contact pins from the sockets could mechanically and releasably engage. It will be apparent to those of ordinary skill in the art that it is immaterial whether the pin-shaped terminals are on the discharge tube and the tubular terminals are on the sockets, or vice versa. If a direct current discharge tube is to be used, one could equip one base with a pin-shaped contact element (anode side) and the other base with a tubular contact element; this would reliably prevent inadvertent upside-down lamp mounting.

Various changes and modifications are possible within the scope of the inventive concept, and features of one embodiment could be combined with features of any other embodiment described above.

What is claimed is:

1. An immersible lamp for a photochemical reactor, comprising
   a generally tubular discharge lamp (1);
   an outer bulb (10) surrounding said discharge lamp (1) and adapted for passage of inert cooling gas therebetween;
   a pair of axially oppositely located electrical contact terminals (2, 3) on said discharge lamp (1), at least one of said contact terminals serving simultaneously as a securing means;
   first and second sockets (4,5) mounted in said outer bulb (10) and receiving respective ends of said tubular discharge lamp, at least one (4) of said sockets being movable;
   wherein
   said movable socket (4) is slidable along a longitudinal axis (12) of said outer bulb (10);
   a plurality of guide rods (6,7,16) are provided to maintain axial alignment of said movable sock it; and
   a spring element (8) around one (16) of said guide rods maintains said movable socket (4) in releasable engagement with one of said contact terminals (2) of said discharge lamp (1).

2. The immersible lamp of claim 1,
   wherein one (5) of said sockets is not movable and serves as a holding means.

3. The immersible lamp of claim 1, wherein
   at least two of said guide rods are aligned parallel to each other at a predetermined spacing, and serve as runners on which said movable socket (4) slides.

4. The immersible lamp of claim 2, wherein said non-movable socket (5) is secured to at least one (6,7) of said guide rods.

5. The immersible lamp of claim 3, wherein a third guide rod (16) is provided, aligned parallel to first and second of said guide rods.

6. The immersible lamp of claim 5, wherein said third guide rod (16) serves as an electrical supply conductor.

7. The immersible lamp of claim 3, wherein said movable socket (4) comprises insulating material.

8. The immersible lamp of claim 5, wherein said spring element (8) is a coil spring mounted on said third guide rod (16).

9. The immersible lamp of claim 1, wherein said spring element (8) is electrically conductive, and provides an electrical connection between said third guide rod and said movable socket (4).

10. The immersible lamp of claim 1, wherein said spring element (8) is electrically connected and mechanically secured at one of its ends to said third guide rod (16).

11. The immersible lamp of claim 1, wherein at least one of said guide rods (6, 7) serves as an electrical supply conductor.

12. The immersible lamp of claim 1, further comprising a terminating head (21), at one end of said outer bulb (10), which serves to support and align said guide rods (6,7,16).

13. The immersible lamp of claim 12, wherein said outer bulb (10) has a closed end (27), remote from said terminating head (21).

14. The immersible lamp of claim 1, wherein at least one of said guide rods is hollow and defines a gas flow channel.

15. The immersible lamp of claim 12, wherein said terminating head (21) is separated into two gas chambers, a first one (23) of said chambers serving as a gas inlet chamber and being connected through one of said guide rods to a first interior portion (27) of said outer bulb (10), and a second one (24) of said chambers serving as a gas outlet chamber and being connected (18) to another interior portion of said outer bulb (10).

16. The immersible lamp of claim 12, wherein at least one of said guide rods (6,7) is hollow and defines a channel for supply of inert gas to an end region (27) of said outer bulb (10).

17. The immersible lamp of claim 1, wherein said contact terminals (2,3) are plug contact terminals.

* * * * *